United States Patent [19]
Abe et al.

[11] Patent Number: 5,263,109
[45] Date of Patent: Nov. 16, 1993

[54] OPTICAL TRANSMISSION PATHS AND METHODS OF MEASURING THEIR OPTICAL TRANSMISSION TIMES

[75] Inventors: Hajime Abe; Atsushi Takai, both of Kokubunji, Japan

[73] Assignee: Hitachi, Ltd., Tokyo, Japan

[21] Appl. No.: 895,779

[22] Filed: Jun. 9, 1992

[30] Foreign Application Priority Data

Jun. 14, 1991 [JP] Japan .................. 3-143018

[51] Int. Cl.$^5$ ............ G02B 6/00; G02B 6/36
[52] U.S. Cl. ............... 385/115; 250/227.12; 356/5; 385/12
[58] Field of Search ............ 250/227.12, 227.19, 250/227.27; 385/24, 12, 115; 356/5

[56] References Cited

U.S. PATENT DOCUMENTS

| | | | |
|---|---|---|---|
| 3,881,976 | 5/1975 | Jones | 385/115 X |
| 3,940,608 | 2/1976 | Kissinger et al. | 385/115 X |
| 4,062,618 | 12/1977 | Steensma | 385/115 X |
| 4,249,266 | 2/1981 | Nakamori | 385/24 X |
| 4,781,427 | 11/1988 | Husbands et al. | 385/24 |
| 4,911,515 | 3/1990 | So et al. | 385/24 X |

FOREIGN PATENT DOCUMENTS 64-48011  2/1989  Japan .

*Primary Examiner*—Akm E. Ullah
*Attorney, Agent, or Firm*—Kenyon & Kenyon

[57] ABSTRACT

An optical transmission time measuring device for an optical transmission path includes an optical bidirectional coupler having at least two input ports and at least two output ports. A pulse light source is connected to one of the input ports of the coupler and photodetector is connected to another one of the input ports. A timing control unit is used to time the pulse light source and the photodetector. A first optical connector is connected to one of the output ports for connecting a reference optical waveguide thereto and a second optical connector is connected to another one of the output ports for connecting a measured optical waveguide thereto.

18 Claims, 5 Drawing Sheets

OPTICAL TRANSMISSION PATHS AND METHODS OF MEASURING THEIR OPTICAL TRANSMISSION TIMES

BACKGROUND OF THE INVENTION

The present invention relates to optical transmission lines used when optical signals are transmitted in parallel between and through devices, methods of making such optical transmission paths, and methods and devices for measuring their optical transmission times.

Japanese patent publication JP-A-64-48011 discloses a parallel data transmission optical cable which performs parallel transmission of data at high speed between computers and between computer terminals using a plurality of optical fibers.

This publication discloses the measurement of uneven optical path lengths of the respective optical fibers before a connector is attached, adjustment of the position of connector attachment such that the unevenness of the optical path lengths is less than 50 cm and then attachment of the connector. However, this publication does not disclose a specified optical path length measuring device and method. This publication is only directed to changes in the optical path length between connectors provided at the opposite ends of the optical fibers which constitute the optical cable and does not consider the respective absolute values of the optical path lengths of the optical fibers and the difference in optical path length between the optical cables.

When processing of data is made while transmitting-/receiving data between and in the devices, an optical transmission path where not only unevenness of optical transmission times but also optical transmission times themselves are set is required. In addition, in order to increase the signal transfer speed, it is necessary to adjust with high accuracy the optical transmission time of the optical transmission path.

SUMMARY OF THE INVENTION

The present invention relates to an optical transmission path where the optical transmission time of the optical waveguide is restricted to within a predetermined range.

The present invention also relates to a highly accurate device and method which easily measures the optical transmission time of an optical transmission path in a time region.

The present invention further relates to a method of making an optical transmission path where the optical transmission time of the optical waveguide is adjusted.

In the present invention, the difference in optical transmission time between a reference optical waveguide and an optical waveguide which constitutes an optical transmission line may be measured, and the difference is suppressed to within a predetermined value to thereby make an optical transmission path which restricts the optical transmission time to within a predetermined range.

The difference in optical transmission time between the reference optical waveguide and an optical waveguide which constitutes an optical transmission path with a connector attached to only one end of the path is measured. When this difference is out of the target range, measurement of the difference in optical transmission time and adjustment of the optical waveguide length at its end with no connector attached thereto are sequentially repeated to adjust the optical transmission time. If necessary, another connector may be attached to the opposite end of the optical waveguide to thereby obtain an optical transmission path having an equal optical length with connectors attached to the opposite ends thereof.

When the optical transmission time is measured, the measured optical waveguide and the reference optical waveguide should be of the same kind to thereby put both the optical waveguides in the same ambient conditions and hence to greatly stabilize the measuring system.

Pulse light is branched into a plurality of optical waveguides and those portions of pulse light reflected by the optical waveguides are synthesized to measure the optical transmission time.

According to the present invention, an optical waveguide is produced where the optical transmission time of the optical waveguide which constitutes the optical transmission path is restricted to within a predetermined range.

The difference in optical transmission time between the reference optical waveguide and an optical waveguide which constitutes an optical transmission path with a connector attached to only one end of the path is measured. When this difference is out of the target range, measurement of the difference in optical transmission time and adjustment of the optical waveguide length at its end with no connector attached thereto can be sequentially repeated to adjust the optical transmission time. If necessary, another connector may be attached to the opposite end of the optical waveguide to thereby obtain an optical transmission path having an equal optical length with connectors attached to the opposite ends thereof.

When the optical transmission time is measured, the measured optical waveguide and the reference optical waveguide should be of the same kind of optical waveguide to thereby put both the optical waveguides in the same ambient conditions and hence to greatly stabilize the measuring system.

A device is provided where pulse light is branched into a plurality of optical waveguides and those portions of pulse light reflected by the optical waveguides are synthesized to measure the optical transmission time.

DETAILED DESCRIPTION

Figure 1:
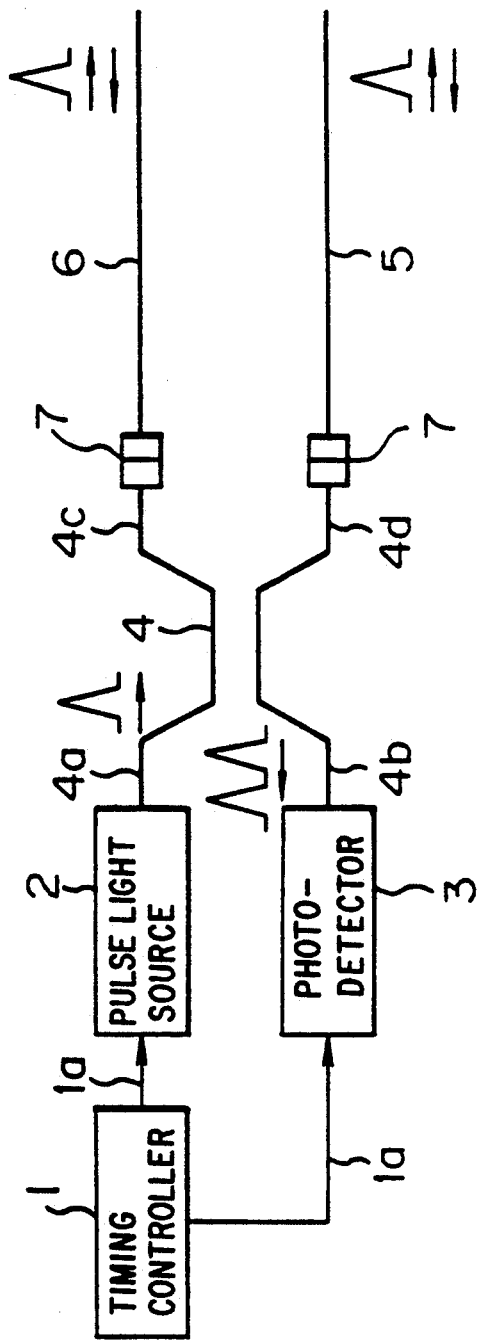
FIG. 1 shows one embodiment of measurement of an optical transmission time according to the present invention.

FIG. 1 shows one embodiment of measurement of an optical transmission time according to the present invention.

Ports 4c and 4d of an optical bidirectional coupler 4 are connected to a measured optical waveguide 6 and a reference optical waveguide 5, respectively. Pulse light from a pulse light source 2 enters the port 4a, and is branched by the coupler 4 to enter the ports 4c and 4d. Two light portions reflected by remote ends of the waveguides 6 and 5 are synthesized by the coupler 4. The time interval between these two reflected light portions is measured by a photodetector 3 connected to the port 4b.

The pulse light source 2 and photodetector 3 are actuated simultaneously through control signal lines 1a by a timing controller 1. When the optical fiber is used as an optical waveguide, the ports 4c and 4d of the coupler 4 are connected to the waveguides 6 and 5, respectively, through corresponding optical connectors 7 for easy handling. The ambient conditions, for example, temperature and tension for the waveguides 6 and 5 are equalized beforehand and the waveguides 6 and 5 should be of the same kind to perform measurement of the optical transmission time with high accuracy.

The use of a timing generator, for example, with jitter of 10 psec, as the timing controller 1, a pulse laser diode, for example, of a pulse width of 30 psec, as the pulse light source 2, and an optical sampling oscilloscope as the photodetector 3 permits measurement of the optical transmission time with an accuracy of the order of 30 psec. A photodiode and an amplifier may be combined as the photodetector 3.

When the photodetection sensitivity of a reception operation processor 3 is low, a high optical reflectance end face, for example, of a deposited gold film, is connected to the opposite end face of either the waveguide 6 or 5 from its end face connected to the connector 7.

Figure 2:
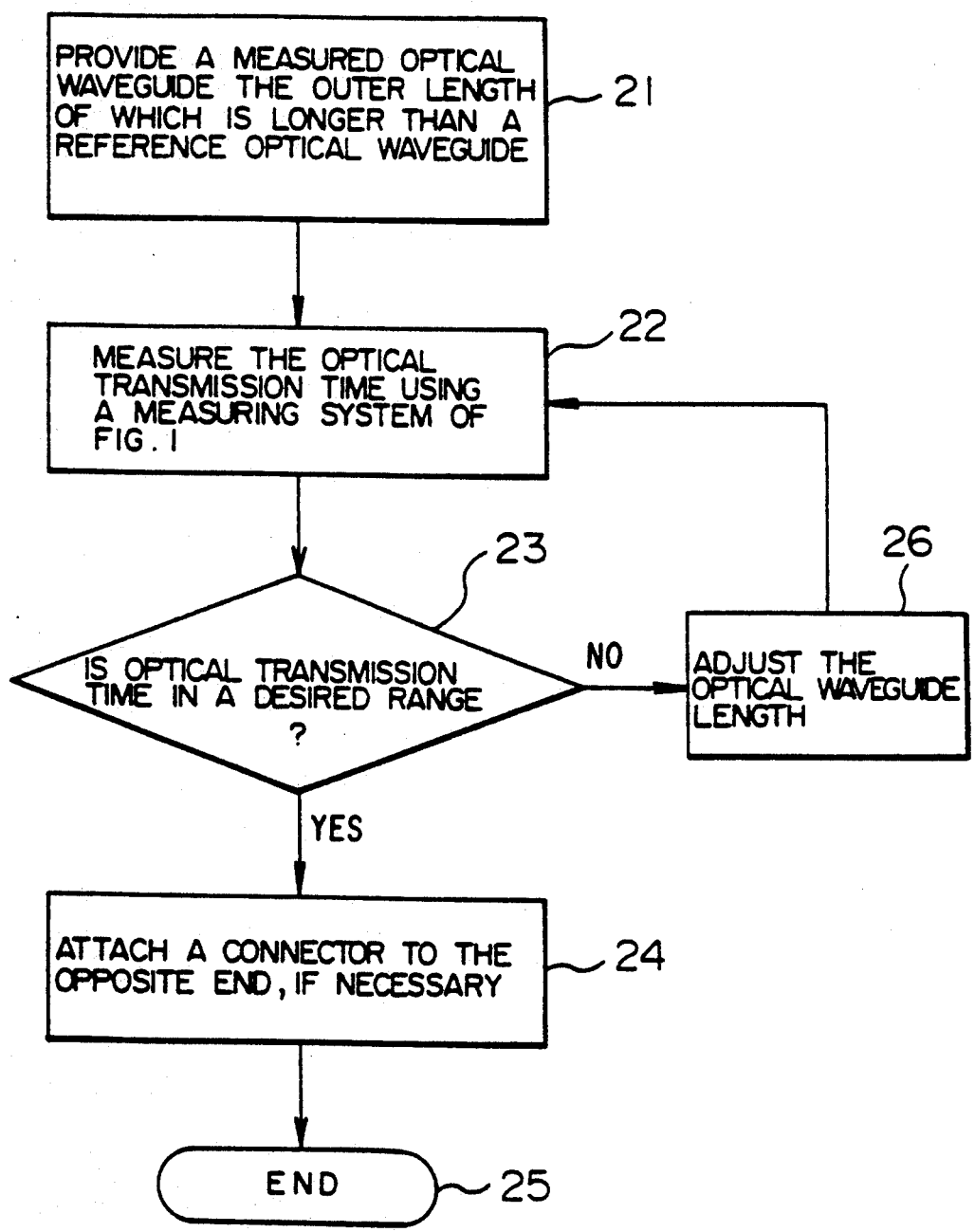
FIG. 2 is a flowchart indicative of the manufacture of an optical transmission path where the optical transmission time is set.

FIG. 2 is a flowchart indicative of the manufacture of the optical transmission path where an optical transmission time is set. A measured optical waveguide is provided by cutting such that its outer length is longer than the reference optical waveguide (step 21). The optical transmission time of the waveguide is measured using the measuring system of FIG. 1 (step 22). It is then checked whether the optical transmission time is within a desired range (step 23). If so, a connector is also attached to the opposite end of the waveguide, if necessary (step 24), to thereby end the processing (step 25). If the optical transmission time is not within a desired range at step 23, the length of the optical waveguide is adjusted (step 26). As just described above, the optical transmission time can be restricted to within a predetermined range by adjusting the waveguide length of the measured optical waveguide 6 at its end where no bidirectional coupler 4 is connected, on the basis of the difference in optical transmission time between the measured optical waveguide and the reference waveguide. In order to adjust the waveguide, for example, a cutting method may be used. When an optical fiber is used as the optical waveguide, an additional fiber may be connected by fusion.

Figure 3:
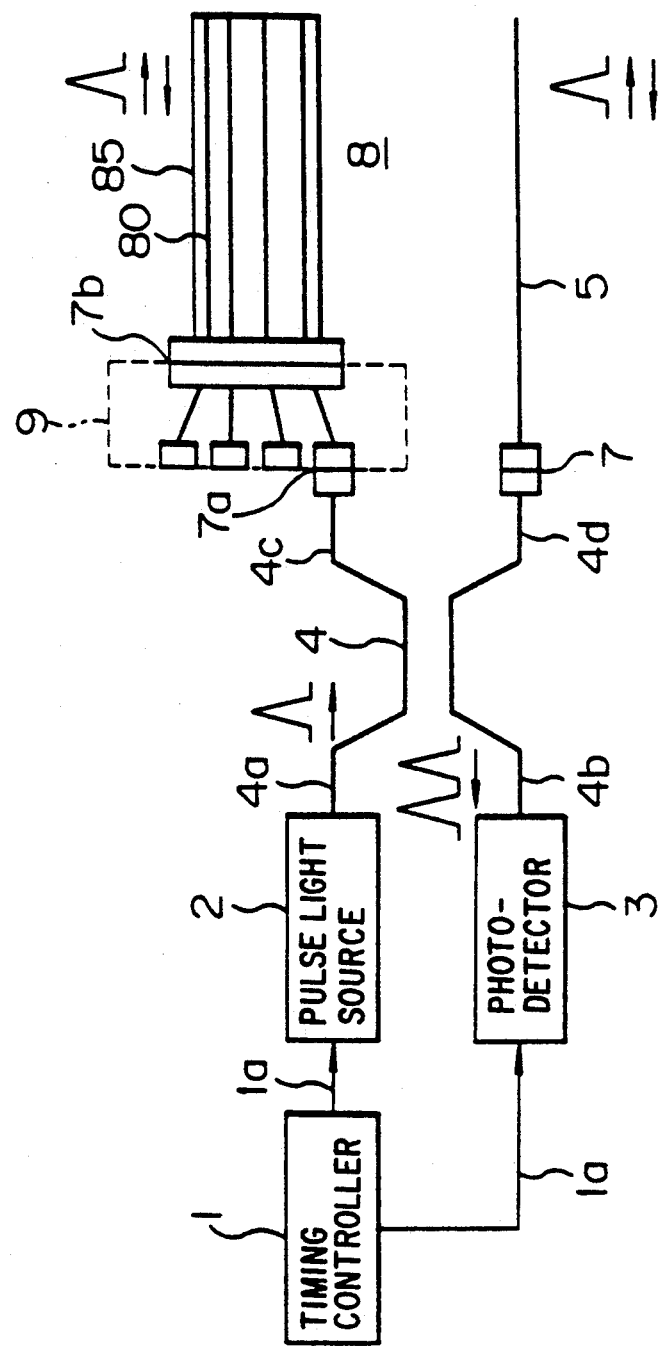
FIG. 3 shows an example of measurement of an optical transmission time for a tape fiber.

FIG. 3 shows an example of measurement of the optical transmission time of a tape fiber.

A connector conversion adaptor 9 which has a multi-channel connector 7b attached to one end of a tape fiber and single-channel connectors 7a attached to the other respective fiber ends of the tape fiber is connected through a single-channel connector 7a to the port 4c of the coupler 4 at an end concerned and connected to a tape fiber 8 through the multi-channel connector 7b at the opposite end. The tape fiber 8 is composed of 4 core lines 80 and a jacket 85 which covers the core lines. The coupler port 4d is connected to the reference optical fiber. One channel of the tape fiber 8 corresponding to the connected single-channel connector 7a is selected as an optical fiber to be measured. The difference in optical transmission time between the measured optical fiber and the reference optical fiber 5 is measured in the same manner as in the embodiment of FIG. 1. Then, the tape fiber 8 is removed and the difference in optical transmission time between the connector conversion adaptor 9 alone and the reference optical fiber 5 is measured. By taking the difference between both the differences, the difference in optical transmission time between the measured fiber and the reference optical fiber 5 is obtained. By a similar operation for the remaining channels, their optical transmission times are measured.

By adjusting the length of the measured optical fiber at its end where no connector is attached, in accordance with the measured optical transmission time difference, the optical transmission time can be restricted to within a predetermined range. If necessary, a connector may be attached to the opposite end of the measured fiber.

Alternatively, a tape fiber with a connector at each end where the optical transmission time is set may be obtained by fusing and connecting core lines at adjacent free ends of two tape fibers each with a connector at the opposite end.

FIG. 3 shows one example of a 4-channel tape fiber, but the number of core lines of the tape fiber is not limited to 4. A tape fiber having a required number of core lines may be used, as required. A connector conversion adaptor including a required number of core lines may be used.

Figure 4:
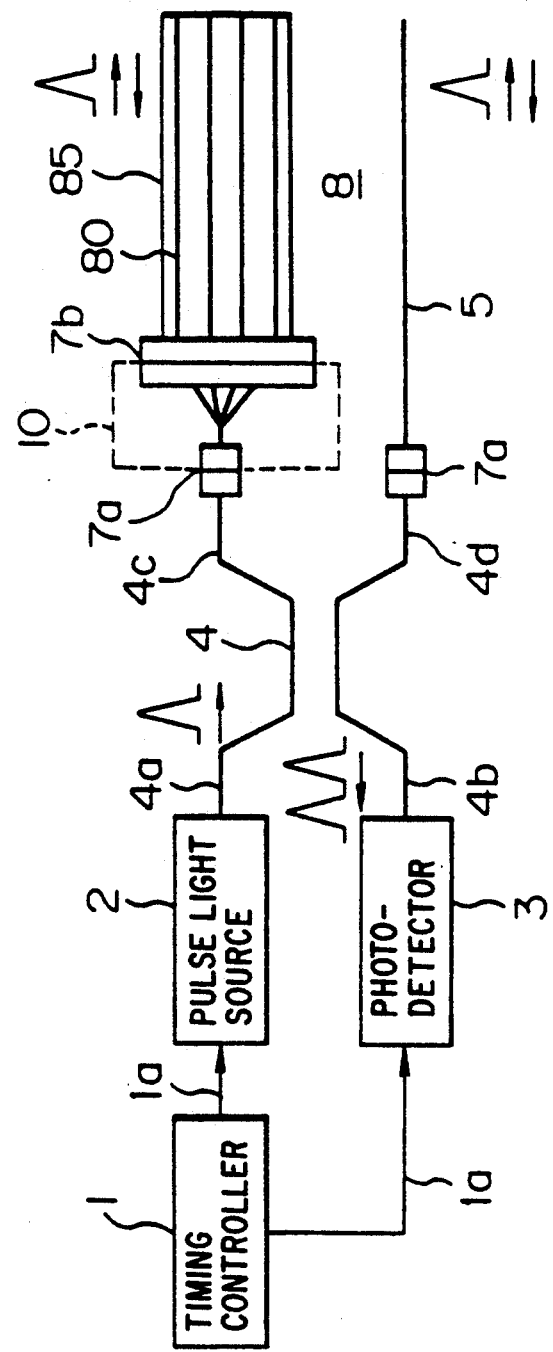
FIG. 4 shows one embodiment of measurement of an optical transmission time for a tape fiber.

FIG. 4 shows one embodiment of measurement of the optical transmission time in a tape fiber. The tape fiber 8 is connected through a star coupler 10 to the port 4c of the coupler 4. This embodiment is characterized in that the respective optical transmission times for the corresponding core paths can be measured at a time. The branching ratio of the incident pulse light can be equalized or changed by properly selecting the coupling ratio of the coupler 4 and the branch ratio of the star coupler 10.

Figure 5:
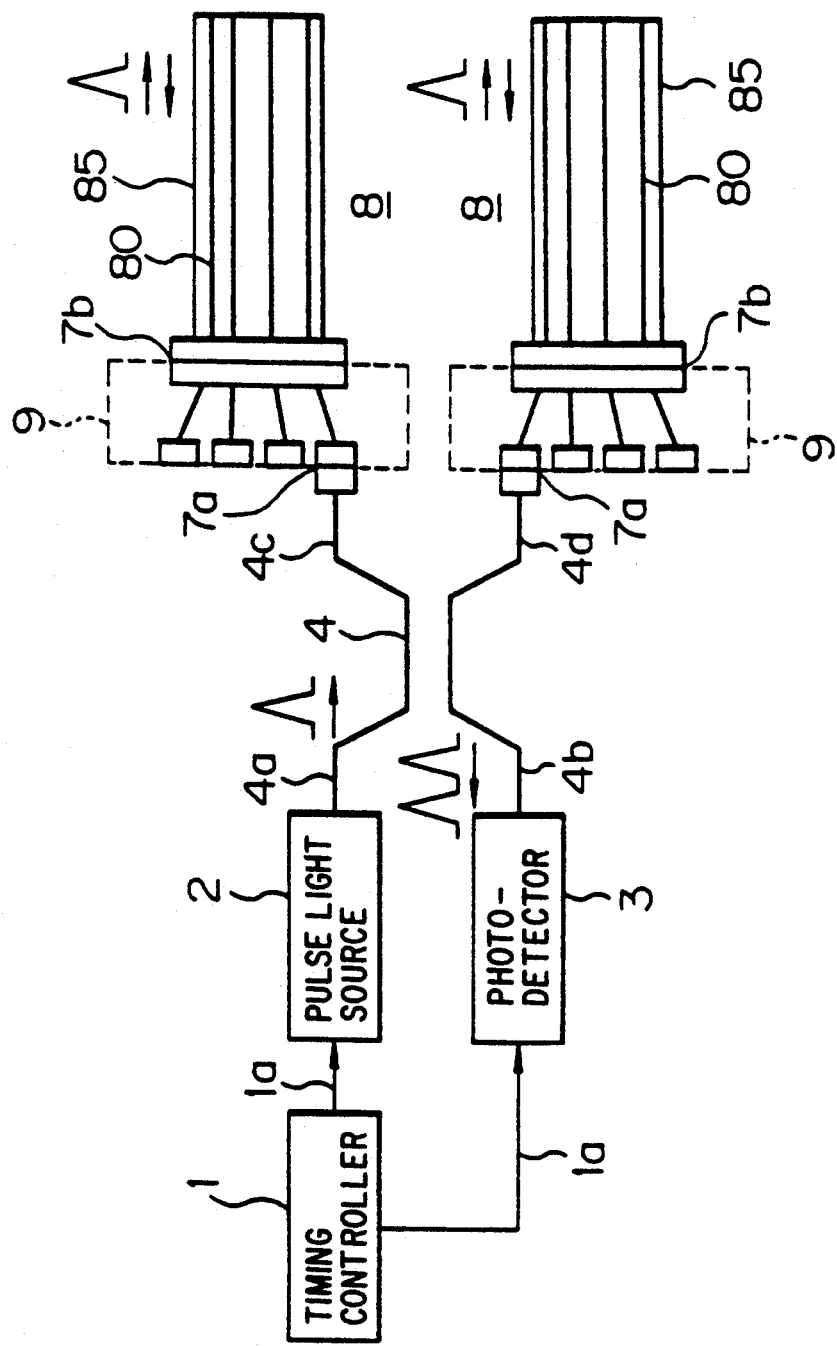
FIG. 5 shows one example of measurement of the difference in optical transmission time between 4-channel tape fibers.

FIG. 5 shows an example of measurement of the difference in optical transmission time between two 4-channel line tape fibers. Two connector conversion adapters 9 are prepared. The single-channel connectors 7a of the two adapters are connected to the ports 4c and 4d of the coupler 4. First, the difference in optical transmission time between the two adapters is measured. A 4-channel tape fiber 8 with a multi-core connector at one end is connected at that connector to the connector conversion adaptor 9. One of the tape fibers is handled as the measured optical fiber and the other as the reference optical fiber to thereby measure the difference in optical transmission time between the channels. By taking the difference between both the differences, the difference in optical transmission time between the two 4-channel tape fibers is measured.

The length of the measured optical fiber is adjusted at its end where no connector is attached, in accordance with the measured optical transmission time difference to thereby limit the optical transmission time difference to within a predetermined range. If necessary, a connector may be attached to the opposite end of the fiber.

According to the present invention, a parallel optical transmission path where the optical transmission time is set with high accuracy is obtained which is advantageous for the parallel transmission of optical signals.

What is claimed is:

1. An optical transmission time measuring device for an optical transmission path, comprising:
   an optical bi-directional coupler having at least two input ports and at least two output ports;
   a pulse light source connected to a first of the input ports of said coupler;
   a photodetector connected to a second of the input ports of the coupler;
   a timing control unit connected to said pulse light source and said photodetector through respective control signal lines;
   a first optical connector connected to a first of the output ports of said coupler for connecting a reference optical waveguide thereto; and
   a second optical connector connected to a second of the output ports of said coupler for connecting a measured optical waveguide thereto.

2. An optical transmission time measuring device according to claim 1, further comprising a connector conversion adaptor disposed between said second optical connector and said measured optical waveguide and having a plurality of single-channel connectors at one end and a multi-channel connector at the other end.

3. An optical transmission time measuring device according to claim 1, further comprising an optical star coupler disposed between said second optical connector and said measured optical waveguide.

4. An optical transmission time measuring device according to claim 1, wherein at least one of the reference optical waveguide and the measured optical waveguide comprises an optical fiber.

5. An optical transmission time measuring device according to claim 1, wherein at least one of the reference optical waveguide and the measured optical waveguide comprises a tape fiber of optical fibers.

6. An optical transmission time measuring device according to claim 1, wherein at least one of the reference optical waveguide and the measured optical waveguide have at one end an end face with a high optical reflectance.

7. A method of making an optical transmission line comprising the steps of:
   preparing a first optical waveguide as a reference optical waveguide; preparing a second optical waveguide as an optical transmission line, the outer length of which is longer than the first optical waveguide;
   measuring a difference in optical transmission time between the first and second optical waveguides by detecting light pulses reflected at remote ends of the first and second optical waveguides; and
   adjusting the outer length of the second optical waveguide so that the difference in optical transmission time between the first and second optical waveguides falls within a predetermined range.

8. A method according to claim 7, wherein at least one of the remote ends of the first and second optical waveguides has an end face with a high optical reflectance.

9. An optical transmission line produced by the method of claim 7.

10. An optical transmission line according to claim 9, wherein at least one of the first and second optical waveguides comprises an optical fiber.

11. An optical transmission line according to claim 9, wherein at least one of the first and second optical waveguides comprises a tape fiber of optical fibers.

12. An optical transmission line according to claim 9, wherein at least one of the first and second optical waveguides have at one end an end face with a high optical reflectance.

13. A method of making an optical transmission path having a plurality of optical waveguides arranged in parallel, comprising the steps of:
   preparing a first optical waveguide as a reference optical waveguide;
   preparing a plurality of second optical waveguides as an optical transmission path, the outer lengths of which are longer than the first optical waveguide;
   measuring a difference in optical transmission time between the first optical waveguide and each of the second optical waveguides by detecting light pulses reflected at remote ends of the first and second optical waveguides; and
   adjusting the outer length of the second optical waveguides so that the difference in optical transmission time between the first optical waveguide and each of the second optical waveguides falls within a predetermined range.

14. An optical transmission path produced by the method of claim 13.

15. An optical transmission path according to claim 14, wherein at least one of the first and second optical waveguides comprises an optical fiber.

16. An optical transmission path according to claim 14, wherein at least one of the first and second optical waveguides comprises a tape fiber of optical fibers.

17. An optical transmission path according to claim 14, wherein at least one of the first and second optical waveguides have at one end an end face with a high optical reflectance.

18. A set of optical transmission paths comprising:
   a first optical transmission path having a plurality of first optical waveguides arranged in parallel;
   a second optical transmission path having a plurality of second optical waveguides arranged in parallel;
   a measuring device measuring a difference in optical transmission time between the first and second optical waveguides by detecting light pulses reflected at remote ends of the first and second optical waveguides; and an adjusting device adjusting the outer length of the second waveguides so that the difference in optical transmission time between the first and second optical waveguides falls within a predetermined range.

* * * * *